J. P. HAYES.
ELECTRIC CONTROLLER.
APPLICATION FILED JUNE 11, 1907.

1,017,413.

Patented Feb. 13, 1912.

WITNESSES:
Samuel Payne
N. H. Butter

INVENTOR
J. P. Hayes
BY H. C. Everitt & Co.
Attorneys

J. P. HAYES.
ELECTRIC CONTROLLER.
APPLICATION FILED JUNE 11, 1907.

1,017,413.

Patented Feb. 13, 1912.

WITNESSES:
Samuel Payne
L. H. Butler

INVENTOR
J. P. Hayes.
BY H. C. Everett Co.
Attorneys

UNITED STATES PATENT OFFICE.

JOHN P. HAYES, OF PITTSBURGH, PENNSYLVANIA.

ELECTRIC CONTROLLER.

1,017,413.      Specification of Letters Patent.      Patented Feb. 13, 1912.

Application filed June 11, 1907. Serial No. 378,330.

*To all whom it may concern:*

Be it known that I, JOHN P. HAYES, citizen of the United States of America, residing at 19 Joel street, Mount Washington, Pittsburgh, in the county of Allegheny and State of Pennsylvania, have invented certain new and useful Improvements in Electric Controllers, of which the following is a specification, reference being had therein to the accompanying drawing.

This invention relates to an electric controller, and its principal objects are as follows: first, to start in either direction, at near or remote distances, to automatically cut out resistance in series with an armature of an electric motor, during the starting, whereby the armature is brought up to its normal speed gradually, and in the stopping of said motor, resistance is automatically inserted in series with the armature, until the circuit is opened to the supply line.

Before entering into the description of the construction and operations of the controller, I will here state that I prefer to use a reciprocating electric motor of the type shown and claimed in Letters Patent No. 869,780 granted to me October 29th, 1907, as the prime mover of this controller. In some operations of the controller fairly good results can be had when the controller is actuated by rotary electric motors, electric magnets of the plunger type, reciprocating water motors, compressed air motors, or steam motors, but for the general scope for which this invention is intended, I am not aware of any other means by which the controller can be actuated to give results as the above mentioned preferred motor. I therefore, deem it advisable to give a description of the reciprocating motor, in connection with my invention, so that the operations of the controller throughout the description may be more readily understood.

In reference to the drawings which form a part of this specification.

Figure 1:
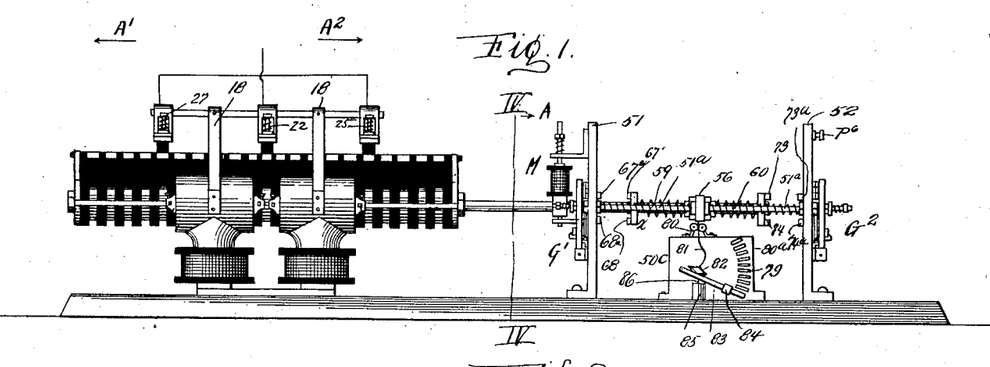
Figure 1 is a side elevation of the controller coupled to a two pole reciprocating motor.
Figure 2:
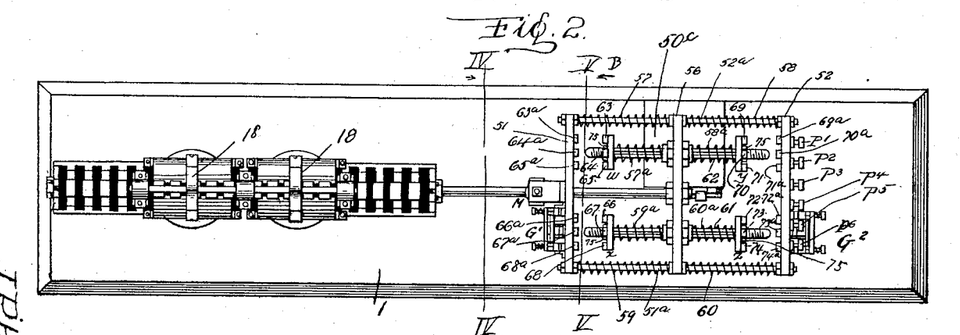
Fig. 2 is a plan of the same.
Figure 3:
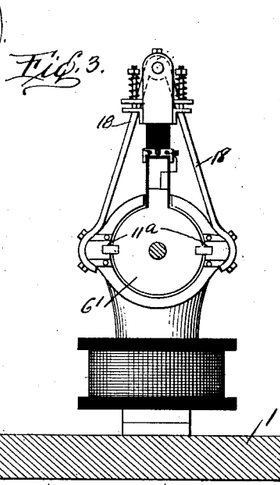
Fig. 3 is an enlarged end view of a motor.
Figure 4:
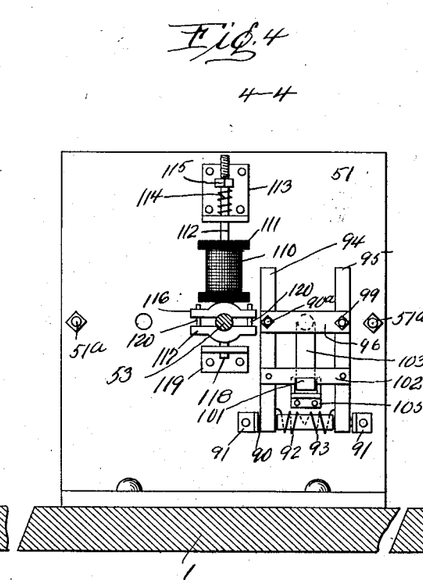
Fig. 4 is an enlarged cross sectional view taken on the line IV—IV of Fig. 1 looking in the direction of the arrow A of said figure.
Figure 5:
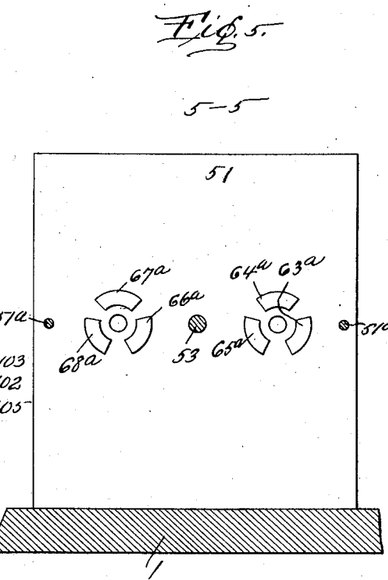
Fig. 5 is a similar view taken on the line V—V of Fig. 2, looking in the direction of the arrow B of said figure.
Figure 6:
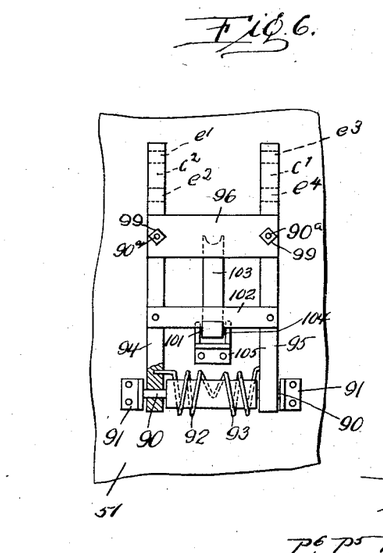
Fig. 6 is a front elevation of a circuit breaker constituting a part of the controller.
Figure 7:
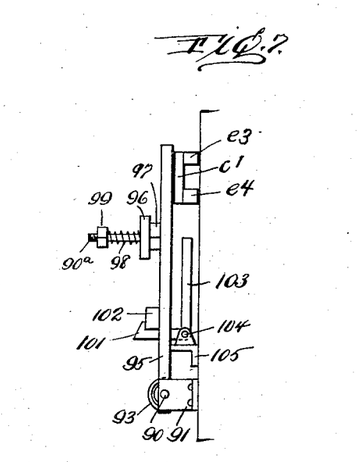
Fig. 7 is an elevation of the same.
Figure 8:
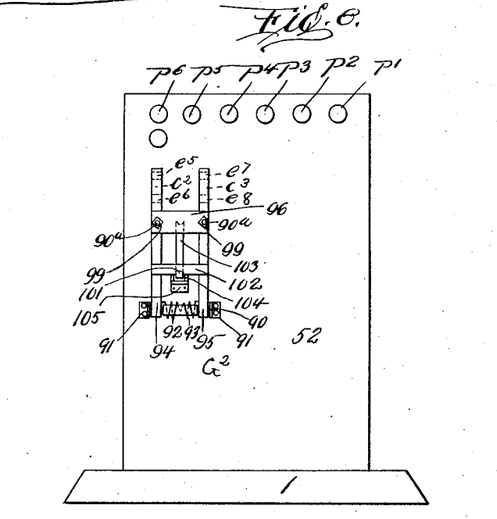
Fig. 8 is an end view of the controller.
Figures 9, 10, 11, 12:
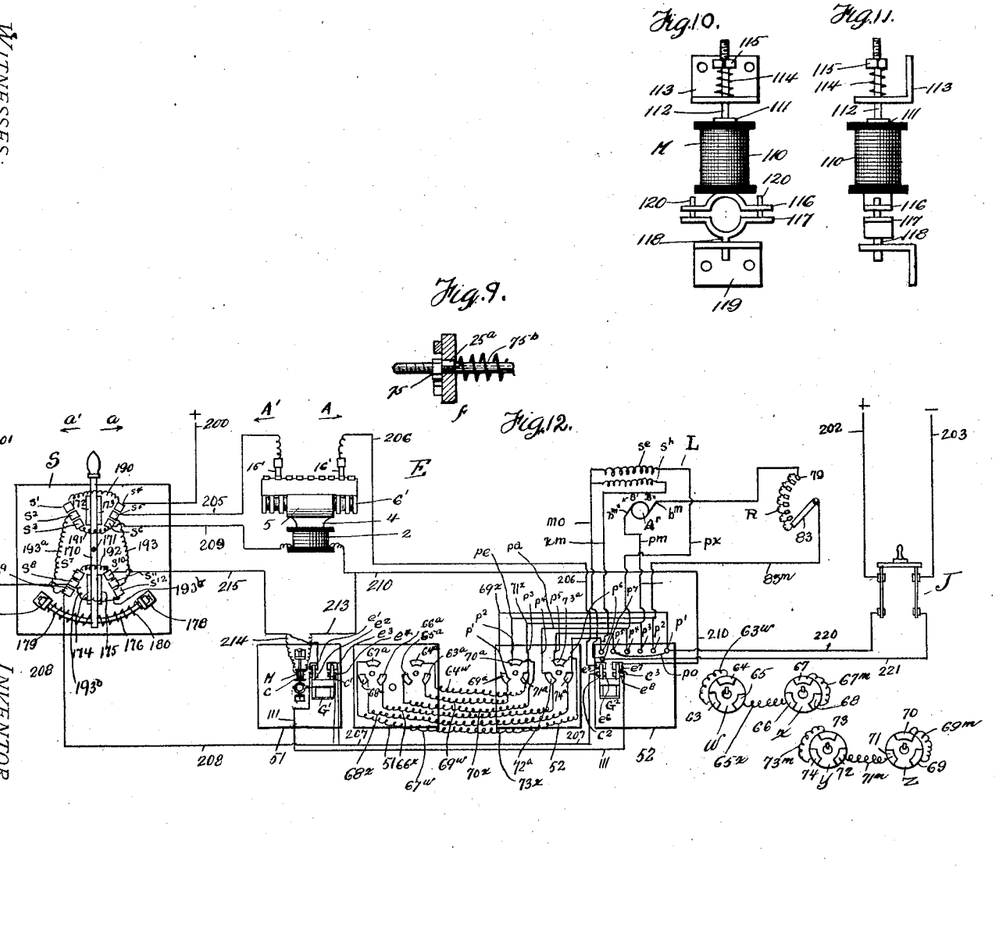
Fig. 9 is a detailed sectional view of a portion of a controller arm.
Fig. 10 is a front elevation of the lock magnet constituting a part of the controller.
Fig. 11 is a side elevation of the same.
Fig. 12 is a diagrammatic view showing the wiring of the controller to a motor, which represents a compound wound rotary motor.

I will first describe the controller illustrated in Figs. 1 and 2 of the drawings. Two standards, 51 and 52 are supported by a base 1 and rods $51^a$ and $52^a$ extend from the standard 51 to standard 52. On the inside of standard 51 are mounted conductor contacts $63^a$ to $68^a$ and on the outside of said standard are mounted what I term a lock magnet M (but I wish to have this element construed in the broadest sense) and a circuit breaker $G^1$. A detail of the lock magnet M is shown in Figs. 10 and 11 and a detail of the circuit breaker $G^1$ is illustrated in Figs. 6 and 7. On the inside of standard 52 are mounted conductor contacts $69^a$ to $74^a$ inclusive, and upon the outside binding posts $P^1$ to $P^7$ and a circuit breaker $G^2$ which is identical in form and construction as the one on standard 51. Between the standards 51 and 52 is a reciprocating head 56 movably mounted upon the rods $51^a$ and $52^a$. Upon each side of the cross head 56 are coiled springs 57 to 60 inclusive surrounding the rods $51^a$ and $52^a$, the purpose of which will be hereinafter described. Attached to the cross head 56, passing through a bearing in standard 51 and connected to the shaft of armature 6', by nut 21 is a rod 53. Passing through the cross head 56 and suitably secured thereto are rods 61 and 62 having longitudinal disposed keyways formed therein. Movably mounted upon said rods and prevented from rotating by keys in said keyways are disks W, X, Y, Z, said disks being normally held in engagement with adjustable nuts 75 mounted upon said rods and by coiled springs $57^a$, $58^a$, $59^a$, and $60^a$, surrounding said rods. The disks, W, X, Y, Z, are provided with conductor contacts 63 to 74 inclusive, suitably insulated from the disks. These disks are adapted to engage conductor contacts $63^a$ to $74^a$ inclusive, carried by the standards 51 and 52. In Fig. 9 of the drawings, I have illustrated the manner in which the disks are keyed upon the rods 61 and 62, the key $25^a$ carried by the disks engaging in a keyway $75^b$ formed in the rods 61 and 62. It will be understood that the disks W, X, Y, Z, reciprocate upon these respective rods. Located between the standards 51 and 52 is a rheostat $50^c$ embodying a suitable support secured to the base 1. The support $80^a$ is provided with resistance contacts 79 and with pulley supports 80 for guiding a rope 81 fastened to the movable head 56 and to the expansion spring 82, said spring being fastened to an arm 83 having an adjustable weight 84. In connection with the lever 83, I use a dash-pot 85 of a conventional form, the piston rod 86 of said pot being connected to the lever arm.

Reference is now made to Figs. 6 and 7 showing the detail construction of circuit breakers $G^1$ and $G^2$. These breakers are supported by standards 51 and 52 arranged upon the base 1. Secured to the standard 51 are brackets 91 and journaled in said brackets is a shaft 90. Loosely mounted upon the shaft are breaker arms 94 and 95 normally held under tension by springs 92 and 93 surrounding the shaft 90. Resiliently carried by the breaker arms 94 and 95 is a cross-piece 96, said piece being movably supported upon bolts $90^a$ carried by said breaker arms. Springs 98 are arranged upon the bolts for normally holding the cross-piece in a fixed position; nuts 97 and 99 being employed for adjusting springs 98 and cross-piece 96. Mounted upon the standard 51 (an elevation shown in Fig. 7) intermediate with breaker arms 94 and 95 are brackets 105 carrying a spring-held pin 104, upon which an angle latch has two arms, 101 and 103, the arm 101 engaging a cross-piece 102 carried by the breaker arms 94 and 95, while the arm 103 extends upwardly in the rear of the cross-piece 96. The upper ends of the breaker arms 94 and 95 are provided with conducting contacts $C^1$ and $C^2$, said contacts engaging contacts $e^1$, $e^2$, $e^3$, $e^4$. The circuit breakers are identical upon the standards 51 and 52 and their operation will hereinafter be described.

A detail of the lock magnet will be had by referring to the drawings, Figs. 10 and 11. Wound on a soft iron core 111 is a magnet coil 110 and secured to said core at one end thereof is a rod 112, slidably mounted in a bracket 113. Surrounding rod 112 is a coiled spring 114, resting upon said bracket and retained thereon under tension by a nut 115 adjustably mounted upon the threaded end of the rod 112. The other end of the core 111 is provided with one part 116 of a soft iron clamp, the other part 117 of said clamp being secured to a rod 118 slidably mounted in a bracket 119. Guide pins 120 are arranged upon the part 117 for guiding the part 116. It is evident that the magnetic circuit can be completed by mounting the lock magnet on a magnetic conductor.

Figures 13, 14, 15, 16, 17, 18, 19:
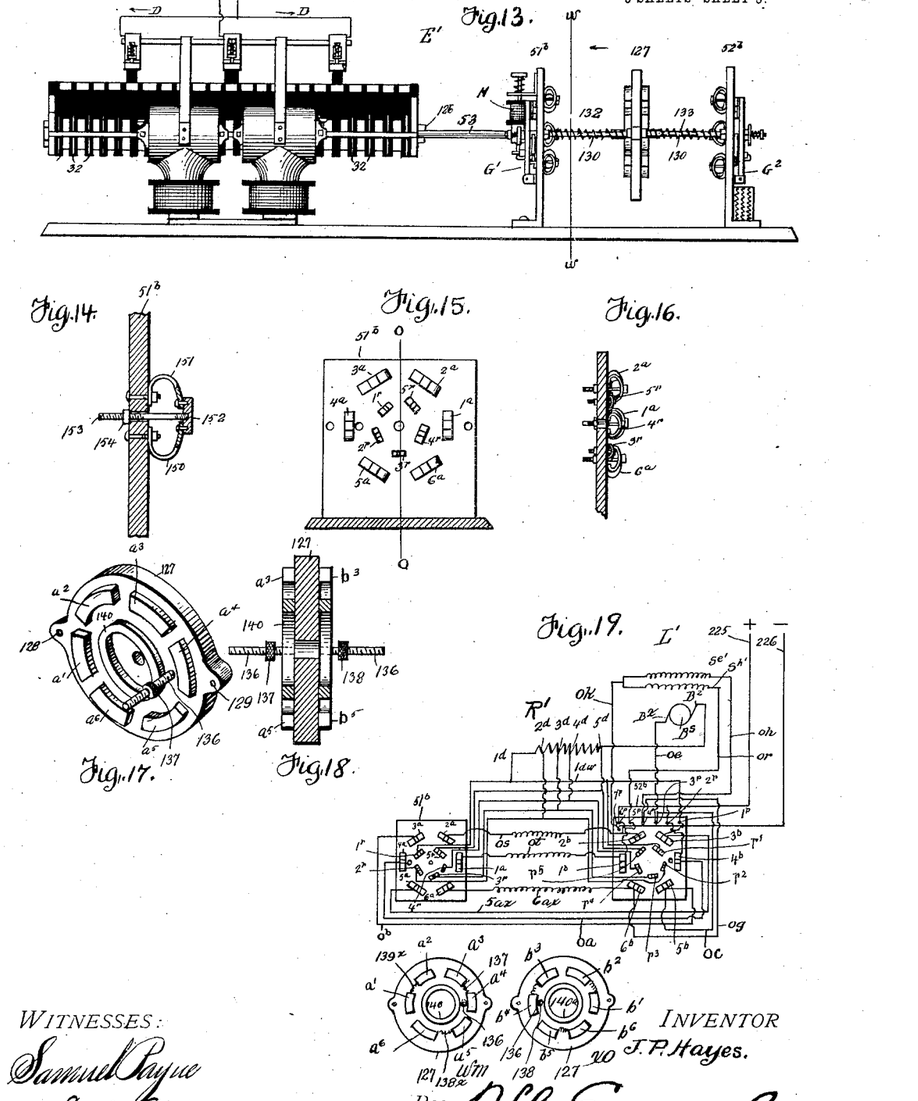
Fig. 13 is an elevation of a modified form of controller coupled to a two pole reciprocating motor.
Fig. 14 is an enlarged detailed sectional view of a portion of the controller illustrated in Fig. 13 of the drawings.
Fig. 15 is a cross sectional view of the controller taken on the line W—W of Fig. 13, looking in the direction of the arrow of said figure.
Fig. 16 is a cross sectional view taken on the line O—O of Fig. 15.
Fig. 17 is a perspective view of a movable head constituting part of the controller illustrated in Fig. 13 of the drawings.
Fig. 18 is a vertical sectional view of the same.
Fig. 19 is a diagrammatic view showing the wiring of the controller illustrated in Fig. 13 to a compound wound rotary motor.

Referring now to Fig. 13, I have illustrated a modified form of the controller coupled to a two pole reciprocating motor $E^1$. Standards $51^b$ and $52^b$ are supported upon a base 1 and by parallel rods 130 and 131. Upon the inside of standard $51^b$ I arrange resilient adjustable conductor contacts $1^a$ to $6^a$ and $1^r$ to $5^r$ inclusive of which a detail view is given in Fig. 14 and a face view given in Fig. 15 showing the contacts arranged on standards $51^b$ and $52^b$. A further explanation will be given of these spring contacts hereinafter. Upon the outside of standard $51^b$ are mounted lock magnet M and circuit breaker $G^1$ identical in form and construction to those used on controller Fig. 1. Upon the inside of the standard $52^b$ I arrange resilient adjustable conductor contacts $1^b$ to $6^b$ and contacts $r^1$ to $r^5$ inclusive, in a similar manner as on standard $51^b$; a face view of the contacts of the last named standard being given in Fig. 15 which will be described hereinafter. Upon the outside of standard $52^b$ is mounted a circuit breaker $G^2$. Between the standards $51^b$ and $52^b$, instead of using a rectangular head 56 with resilient conducting contacts as in the controller of Fig. 1, I use a reciprocating head 127, disk shaped with fixed conductor contacts insulated therefrom; a detail of said head being shown in Figs. 17 and 18 and will be fully explained hereinafter. The reciprocating head 127 is slidably mounted upon the parallel rods 130 and 131 and surrounding said rods on either side of the head 127 are springs 132 and 133, the purpose of the springs 132, 133 will be given hereinafter in the operation of the controller. Attached to the head 127 and passing through a bearing in standard $51^b$ is a rod 53 secured to armature shaft by nut 126.

Referring now to Figs. 17 and 18 the head 127 is provided with conductor contacts $a^1$ to $a^6$ inclusive, a short circuiting conductor 140, an arm 136 extending through the head with an adjustable nut 137 and bored lugs 129. Upon the other side of the head 127 are conductor contacts $b^1$ to $b^6$ inclusive and a short circuiting conductor 140$^a$ similarly arranged. By referring to diagram view Fig. 19, $wm$ shows the side given in the perspective, and $xo$ the opposite side. Fig. 18 shows rod 136 extending through head 127 with an adjustable nut 138, the purpose of which will be hereinafter explained.

Referring now to Fig. 14, I illustrate a detail sectional view of standard 51$^b$ which shows the form of springs used on standards 51$^b$ and 52$^b$. The springs 150 and 151 are suitably secured to the contact 152 and to the standard 51$^b$, and are movably held by a bolt 153 extending through the standard 51$^b$, and provided with a nut 154 adjustably mounted upon the threaded end of the bolt 153. It is obvious that the spring contacts can be mounted upon a material suitably secured to the standard 51$^b$, and that various forms of springs can be used.

The motor employed is shown and described in detail in my Patent 869,780 which will disclose any detail features of the device not herein referred to.

In Fig. 12, I have illustrated diagrammatically a switch S by which the circuits are closed and opened in the reciprocating motor E. To avoid confusion throughout the description, I shall hereinafter refer to the reciprocating motor which actuates the controller, as the actuator, and the motors that are to be controlled by the controller, as rotary motors.

Reference is now made to Fig. 12, which represents a diagrammatic view of the controller and actuator in the operation of controlling a compound rotary motor L. In this figure, I show adjacently the inside and outside of standard 51 and its mountings and I also show adjacently the inside and outside of standard 52 and its mountings. In this Fig. 12 and to the right of standard 52, I show a diagram of the connections of contacts on disks W, X, Y, Z. I have numbers arranged on contacts of the last named disks in order to correspond with the contacting ones on these respective standards 51 and 52, so that the wiring may be more readily traced, on disk W contacts 63, 64, and 65 contacts with the contacts 63$^a$, 64$^a$, 65$^a$, respectively on standard 51. R of Fig. 12 is a resistance of rheostat 50$^c$ of Fig. 1 showing contacts 79 and lever 83. In this Fig. 12, I show a manual switch S for closing and opening the circuits in the actuator E. In the motor L to be controlled $Ar$ represents the armature $bm$ and $bm'$ the brushes $Se$, the series fields and $Sh$ the shunt fields. For a reversible rotation of the armature $Ar$ in motor L the current is reversed in the armature. It will be seen in Fig. 12 that the contacts on the standard 51 are connected by wires 66$^x$ and 67$^w$, etc., to contacts on standard 52. In the first operation to be hereinafter described, the movable head 56 of Fig 1 will move in a direction that the contacts on disk Y Z will engage with contacts on standard 52, therefore, disks W X and their contacts and the contacts on the inside of standard 51 need not be considered in the first described operation. By referring again to Fig. 12, it will be seen that all wires from motor L run to binding posts P$^2$, P$^3$, P$^4$, P$^5$, and P$^6$, P$^7$ P$^1$ being connected to the positive side of main lines. Now one of the functions of the disks Y Z with their arrangement of contacts is to close the several circuits in the motor L. It will be observed that six simultaneous points of the circuits may be closed and likewise opened or the shunt field contacts can be arranged to be closed earlier and opened later, and it is evident that blow out magnets can be arranged on disks W, X, Y, Z to suppress any arcing at the contact points. The cutting out of resistance in motor L will be described hereinafter. In the second described operation which will be more fully explained hereinafter, the movable head 56 moves in a direction that disks W X and their accompanied contacts engage the contacts on standard 51, and disks Y Z need not be considered. The second operation of the controller in the control of motor L is similar excepting the reversible movement of cross head 56 reverses current in the armature circuit $Ar$ which gives to it an opposite rotation. To avoid any unnecessary complications in tracing out the wiring of motor L it may be well to remember in the description that motor L has no electrical connection with circuit breakers G$^1$ G$^2$, lock magnet M, actuator E or switch S. As the actuator E is the prime mover of the cross head 56 the direction of movement of said cross head therefore depends on direction of movement of armature 6' of the actuator. In this operation, the actuator is shunt wound and I have arranged its armatures circuit in series with circuit breakers G$^1$ and G$^2$ and I have arranged its field circuit 4 is series with circuit breakers G$^1$ and G$^2$. The lock magnet circuit M is arranged in circuit with the fields of the actuator in a way that when circuit breakers G$^1$ and G$^2$ are closed, lock magnet M is short circuited, but when either of the circuit breakers G$^1$ and G$^2$ is opened, lock magnet M is put in series with the fields of the actuator. The purpose of the circuit breakers and lock magnet in this operation is that when all resistance is cut out of series with motor L, either of the circuit breakers G$^1$ or G$^2$ is automatically opened, as will hereinafter be described, which opens the circuit in the actuator armature 6' and puts lock magnet M in series with the actuator's fields 4, the lock magnet M being now energized, locks the controller. It is evident with the controller lock and magnet M wound with comparatively fine wire, the electrical energy consumed in fields 4 will be very small.

Following is a diagram of connections and operation of the controller:

Referring to Figs. 2 and 12, first refer to Fig. 2, it will be seen that the contacts are arranged on the standard 52 in the order $69^a$, $70^a$, etc., up to $74^a$, and directly opposite on the disks Y and Z are arranged contacts in the order 69, 70, etc., up to 74. Now by referring to the disks Y, Z in Fig. 12, it will be seen that contact 69 is connected to contact 70, and that contact 71 is connected to contact 72, and that contact 73 is connected to contact 74, it therefore follows that when the contacts on the disks Y Z come in contact with the contacts on the standard 52, contacts $69^a$ and $70^a$ are cross connected and $71^a$—$72^a$ are cross connected and $73^a$—$74^a$ are cross connected. Upon the contacts of disks Y Z engaging the contacts on the standard 52 circuits through the motor L, are closed, which are as follows: From the main line 202, the circuit passes through the switch J to wire 220, binding post $P^1$ to contact $69^a$ to contact 69 of the disk YY, through wire $69^m$ to contact 70 of the same disk, to $70^a$ to binding post $P^2$ to lever 83, through resistance R to brush $bm$, through armature $Ar$ to brush $bm'$, through wire $Pm$ to binding post $P^3$ and then to contact $71^a$ on the standard to contact 71 on the disk Y through wire $71^m$, to contact 72 on the disk Z, to contact $72^a$ on the standard to binding post $P^4$, through wire $Px$ to coil $Se$, to binding post $P^7$, to wire 221, switch J to main line 203. The shunt field's circuit is made at binding post $P^1$ and connects to binding post $P^5$ by a wire $Po$, thence to contact $73^a$, to contact 73 on the disk Z through wire $73^m$ to contact 74 of said disk to contact $74^a$ on the standard, to binding post $P^6$, through wire $Xm$ to shunt coil $Sh$, through wire $Mo$ to binding post $P^7$, and then through the wire 221, switch J, to the main line conductor 203. With the circuit thus closed through the motor L, the armature $Ar$ rotates in the direction of arrow B.

The circuits now will be described of the actuator E, circuit breakers $G^1$ and $G^2$, lock magnet M and switch S.

The main line conductor 200 is connected to contact $S^4$ and main line conductor 201 is connected to $S^8$ of switch S. There are two circuits leading from the switch S, which are as follows: When the switch S is closed by moving the lever arm 170 in the direction of the arrow $a$, the circuits are:—from main line conductor 200 to contact $S^4$, contact 173 to contact $S^5$, wire 205 of the actuator E through armature 6' to wire 206 to the contact $e^5$, carried by the circuit breaker $G^2$ on the standard 52. From this contact the circuit is through contact $C^2$ to contact $e^6$, wire 207 to contact $e^3$ by a contact on the circuit breaker $G^1$ carried by the standard 51. From this contact the circuit passes through contact $C^1$ to contact $e^4$, wire 208 to contact $S^9$, through contact 174 to contact $S^8$, and from there to the main line conductor 201, thus completing a circuit which passes through the armature 6'. The other circuit is from the contact $S^6$ through wire 209, actuator coils 4 and wire 210 to contact $e^7$, from said contact through contact $C^3$ to contact $e^8$, wire 111 to contact $e^2$, through contact C to contact $e^1$, wire 215 to contact $S^{10}$, through wire 192 to contact $S^7$, from said contact to contact 174 carried by the lever 170, to contact $S^8$ and to the main line conductor 201. It will be noted in the last described circuit that wires 213 and 214 leading from lock magnet M are shunted across the wires 210 and 215, that is, the lock magnet M is short circuited through the circuit breakers $G^1$ and $G^2$ and when either of said circuit breakers is open lock magnet M is placed in series with the actuator fields 4. When the circuits above described are closed, the armature and field windings of the actuator E are energized, setting up relative magnetic fields which cause the armature 6' to move in the direction of the arrow $A^2$, moving with it cross-head 56 with disks Y Z and their contacts. Upon these disks engaging the contacts on the standard 52, circuits through the motor L are closed, the armature $Ar$ rotates as heretofore described, and further operations are as follows: As armature 6' of the actuator E moves, the rope 81 connected to the cross head 56, pulls upon the springs 82, moves lever 83 over the contacts 79 cutting out the resistance R, the dashpot 85, resisting any too sudden action of lever 83 in moving over contacts 79. The rods 61 and 62 carried by the crosshead 56 pass through the disks Y and Z, and through the standard 52, compressing springs $58^a$ and $60^a$. The springs 58 and 60 on the rods $52^a$ and $51^a$ are also compressed. As the rod 61 passes through the standard 52, it impinges the crosspiece 96 of the circuit breaker $G^2$, moving said cross piece on the bolts $90^a$ and compresses springs 98. The nut 75 on the rod 61 is adjusted in order that when the crosshead 56 travels a sufficient distance to cut out resistance in the rheostat $50^c$, said nut strikes the arm 103, which trips the arm 101 engaging the cross-piece 102; the increased tension of the springs 98 pressing against the nuts 99 overcomes the tension of the springs 92 and 93, opening the circuit breaker $G^2$. The opening of said circuit breaker opens the circuit to the armature 6' and places the field's circuit 4 of the actuator E in series with the lock magnet M thereby energizing said lock magnet and causing it to attract the clamp member 117, causing it to clamp the rod 53, locking the controller until switch S is opened. When the switch S is open the rod 112 and magnet 110 are elevated by the spring 114, and the clamp member 117 descends to the bracket support 119. The springs 58 and 60 return crosshead 56 and the armature 6' to a central or starting position, opening the circuits to the motor L. The springs 92 and 93 immediately close the circuit breaker G². In the second operation of the controller, or the moving of the head 56 in the opposite direction armature Ar of motor L is caused to rotate in opposite directions.

Referring again to Fig. 2, it will be seen on standard 51 that the contacts arranged thereon are in the order 63ª, 64ª, etc., up to 68ª and directly opposite on the disks W X are arranged contacts in the order 63, 64, etc., up to 68. Referring to the disks, Fig. 12, it will be seen that contact 63 is connected to contact 64, and that contact 65 is connected to contact 66, and that contact 67 is connected to contact 68, it therefore follows that when the contacts on disks W X come in contact with the contacts on standard 51, contacts 63ª and 64ª are cross connected, contacts 65ª and 66ª are cross connected and contacts 67ª and 68ª are cross connected.

It will be seen in Fig. 12 that on the inside of standard 51, instead of having the contacts thereon connected by wire direct to the binding post on standard 52 I have them connected to the contacts on last said standard. In tracing out the circuits, I will neglect mentioning the contacts on standard 52 considering the wire straight from the contacts on standard 51 to the binding posts P², P³, P⁴, etc. on standard 52. The circuits are from main line conductors 202 through switch J, wire 220 to binding post P¹, wire 69ˣ to contact 69ª, wire 69ʷ to contact 63ª. From contact 63ª to contact 63 on the disk W, wire 63ʷ, to contact 64, from said contact to contact 64ª, wire 64ʷ to contact 71ª, wire 71ˣ to binding post P³ wire P$m$ to brush $bm'$, through armature Ar to brush $bm$, to contact 79, through resistance R to lever 83. From the lever 83, the circuit is through wire 83ᵐ to binding post P², wire P$e$ to contact 70ª, wire 70ˣ to contact 65ª, to contact 65 on the disk W, wire 65ˣ to contact 66 on the disk X, to contact 66ª, wire 66ˣ to contact 72ª, wire P$d$ to binding post P⁴, wire P$x$ to series coil S$e$, wire M$o$ to binding post P⁷, wire 221 through switch J to main line 203. The shunt field circuit is from binding post P¹ through wire P$o$ to contact P⁵, by wire to contact 73ª, by wire 73ˣ to contact 67ª, to contact 67 on disk X through wire 67ᵐ to contact 68, to contact 68ª, wire 68ˣ to contact 74ª, by wire to binding post P⁶ through wire X$m$ to shunt coils S$h$, through wire M$o$ to binding post P⁷, wire 221 through switch J to main line 203. With the circuit thus closed in motor L, armature A$r$ rotates in the direction of arrow B'. When the switch S is closed in the direction of the arrow $a'$ (see Fig. 12) contact 172 on the lever 170 engages contacts $s^1$, $s^2$, and $s^3$, while contact 175 of said lever engages contacts $s^{10}$, $s^{11}$, and $s^{12}$. The circuit through the armature 6 of the actuator E is from the main line 200 to contact $s^4$, wire 190 to contact $s'$, through contact 172 to contact $s^2$, wire 193ª to contact $s^0$, wire 208 to contact $e^4$, through contact $c'$ to contact $e^3$, wire 207 to contact $e^6$, through contact $c^2$ to contacts $e^5$, wire 206, through armature to wire 205 to contact $s^5$, wire 193 to contact $s''$, through contact 175 to contact $s^{12}$, wire 193ᵇ to contact $s^8$, and from said contact to the main line conductor 201. If the switch S is closed, the circuit is reversed in the armature 6' of the actuator E and moves in the direction of the arrow A' moving with it the crosshead 56, the contacts on the disks W X engage the contacts on the standard 51, closing circuit in the motor L, causing the armature A$r$ to rotate in the direction as heretofore described. The cutting out of the resistance R the opening of the circuit breaker G¹ and the locking of the magnet M, etc., is identical in every way in this operation as in the first operation heretofore described.

Fig. 19 is a diagram of the circuits of the controller Fig. 13 applied to a compound wound rotary motor L'. One of the objects of the controller of the modified form Fig. 13 in the operation of controlling a motor is to dispense with sliding contacts which are objectionable when the motor is of large size, wherein heavy currents are used. In Fig. 19, L' represents a compound wound motor, B$s$ represents the armature, S$e'$ the series fields and S$h'$ the shunt fields, R' is the resistance. I show in this figure the inside of standard 51ᵇ mounted with resilient contacts 1ª, 2ª, 3ª, 4ª, 5ª, 6ª, and similar contacts 1ʳ, 2ʳ, 3ʳ, 4ʳ, 5ʳ, and to the right of standard 51ᵇ, I show the inside of standard 52ᵇ, with resilient contacts $b^1$, $b^2$, $b^3$, $b^4$, $b^5$, $b^6$, and similar contacts $r^1$, $r^2$, $r^3$, $r^4$, $r^5$, the springs and contacts are identical on the above named standard. Contacts on standard 52ᵇ are connected by wires $oa$, $ob$, etc., to contacts on standard 51ᵇ. Underneath the above described standards are shown face views of the two sides of crosshead 127. The contacts on the view $wm$ contacts on standard 51ᵇ and the contacts on the view $xo$ engages contacts on standard 52ᵇ. By close inspection it will be seen that on view $wm$ that $a'$ is connected by wire to $a^2$, and $a^3$ is connected by wire to $a^4$ and $a^5$ is connected by wire to $a^6$ and that these contacts will cross connect their reciprocals on standard $51^b$ that is $a'$ and $a^2$ will cross $2^a$ and $3^a$, and so on. The functions of conductor 140 is to short circuit $1^r$, $2^r$, etc. Likewise on view $xo$, $b'$ and $b^2$ are connected together $b^3$ and $b^4$ are connected together, and $b^5$ and $b^6$ are connected together and these contacts contact with their reciprocals on standards $52^b$ and cross connect in the same manner as described with standard $51^b$. The resilient contacts $1^a$ to $6^a$ inclusive on the standard $51^b$ are adjusted whereby they will simultaneously contact with the contacts $a'$ to $a^6$ inclusive on the side $wm$ of a disk 127, and the resilient contacts $1^r$ to $5^r$ which are connected to the resistance coils $1^d$ to $5^d$ inclusive, will project farther than the subsequent one in the order named.

The first operation to be described of controller 16, crosshead 127, will move in the direction that the contacts on the side $wm$ of said crosshead will contact with the contacts on standard $51^b$. From the main line conductor 225 to contact $4^b$, through wire $oa$ to contact $4^a$, to contact $a^4$ on disk $wm$, through wire 137 to contact $a^3$ in the same disk, to contact $3^a$, through wire $ob$ to contact $5^b$, through wire $oc$ to binding post $3^p$, through wire $oe$ to brush $Bx$, through armature $Bs$ to brush $B^2$, through resistance $R'$, wire $1^d$ and wire $1^{dw}$ to binding $1^p$, to contact $3^b$, through wire $5^{ax}$ to contact $5^a$, to contact $a^5$ on disk $wm$, through wire $138^x$ to contact $a^6$, to contact $6^a$, wire $6^{ax}$ to contact $6^b$, wire $og$ to binding post $4^p$, through wire $oh$ to $se^1$, through wire $ok$ to contact $7^p$ and main line conductor 226. The shunt field is from $6^p$ to contact $2^b$, wire $os$ to contact $2^a$, to contact $a^2$ on the disk $wm$, through wire $139^x$ to contact $a^1$ on the same disk, to contact $1^a$, wire $ot$ to contact $1^b$, through wire to post $5^p$, through wire $or$ to shunt field $sh'$ and through wire $ok$ to contact $7^p$ and main line conductor 226.

The circuits are closed in the actuator E, circuit breakers $G'$ $G^2$ and lock magnet M, Fig. 13 in a similar manner as described in Fig. 12, and when the circuits are thus closed the armature of the actuator $6'$ moves in the direction of arrow D moving with it crosshead 127 on the rods 130 and 131, compressing springs 132. The rod 136 passes through the standard $51^b$ and the contacts on the side $wm$ of the crosshead 127 engaging with the spring contacts $1^a$, $2^a$, $3^a$, $4^a$, $5^a$, $6^a$, on standard $51^b$ simultaneously closing the circuit throughout motor $L'$ as heretofore described. As the actuator armature $6'$ moves the short circuiting conductor 140 on crosshead 127 engages the contacts, first $1^r$ then $2^r$ to $5^r$ inclusive, as the conductor 140 on crosshead 127 engages with the succeeding one in the order named, resistance $2^d$ to $5^d$ inclusive are cut out or short circuited in the same order to motor $L'$. The nut 137 is adjusted to trip the latch on circuit breaker $G^1$ when the resistance is cut out of circuit to motor $L'$ in the manner and with similar results as previously described in connection with Fig. 12 of the drawings. When the circuits are opened to the actuator, it assumes a central or a starting position opening the circuits to motor $L'$. When the circuits are closed in the actuator $E'$ which causes it to move in the direction of arrow $D'$ moving with it crosshead 127, the contacts on the side XO of said crosshead engages with the contacts on standard $52^b$, this second operation in the control of motor $L'$ is identical to the first operation as above described, excepting that the current is reversed in armature $Bs$ which gives to it an opposite rotation.

I desire to call attention that dash pots of a conventional form can be arranged on standards $51^b$ and $52^b$ in combination with springs to assist in the regulation of the movements of the reciprocating head 127.

From the foregoing description it should be evident to those skilled in the art that numerous modifications may be made in my invention without departing from its scope, and I therefore do not wish to be understood that I limit myself precisely to the apparatus shown.

Having now described my invention what I claim as new, is:—

1. In an electric controller for automatically controlling electric devices, standards, circuit breakers carried thereby, contacts carried by said standards, a head movably mounted between said standards, arms carried by said head for actuating said circuit breakers, and contacts supported by said arms for engaging the contacts of said standards in advance of the actuation of said circuit breakers, and means for controlling the operation of the head.

2. A controller comprising a movable head, arms carried thereby, contacts supported by said arms, automatic circuit breakers actuated by said arms, a lock magnet, actuated by said circuit breakers, standards, contacts supported by said standards and adapted to be engaged by the contacts of said arms, and a rheostat arranged to coöperate with said movable head.

3. A controller comprising a movable head, contacts carried by said head, standards automatic circuit breakers, one of said circuit breakers being actuated by the movement of said head in one direction and the other of said circuit breakers by the movement of said head in the opposite direction, a lock magnet actuated by the movement of said head, contacts adapted to be engaged by the first mentioned contacts, means for retarding the movement of said head in either direction, and means for controlling the operation of the last mentioned means.

4. The combination with a motor and a suitable source of electrical energy, of standards, electrical conductor contacts carried thereby and in circuit with said motor, a reverser head arranged between said standards, a reciprocating electric motor in circuit with said source of electrical energy and controlled by said motor for operating said reverse head, resiliently mounted contact disks carried by said head and adapted to engage the contacts of said standards for starting the first mentioned motor, and a rheostat actuated by said reverser head.

5. The combination with an electric motor and a suitable source of electrical energy, of standards, a reverser head movably mounted between said standards and in circuit with said motor, resilient and stationary contacts for starting said motor, means actuated by said reverser head for gradually bringing said motor up to a predetermined speed, and a reciprocating armature in circuit with said electrical energy for actuating said reverser head.

6. The combination with a motor and a suitable source of electrical energy, of a reverser head, a rheostat actuated by said reverser head for gradually starting said motor, and a reciprocating electric motor in circuit with said source of electrical energy and adapted to control said reverser head.

7. The combination of a reverser head, standards, a reciprocating armature for actuating said reverser head, a manually operated switch for controlling the operation of said armature, circuit breakers carried by said standards and adapted to be actuated by said reverser head, and means actuated by said reverser head for returning said reciprocating armature to its normal position.

8. A controller for motors comprising standards, contacts carried by said standards, a head movably mounted between said standards, a reciprocating motor for moving said head, a plurality of contact disks carried by said head and adapted to engage the contacts of said standards, and a rheostat actuated by the movement of said head.

9. In an electric controller for controlling dynamo electric machines and circuits therefrom, the combination with an electric reciprocating motor, standards, a reciprocating head movably supported between said standards, a plurality of rods secured to and movable with said reciprocating head, adjustable nuts carried by said rods, automatic circuit breakers carried by said standards, said circuit breakers adapted to open and close the controlling circuits in connection with said machines, said circuit breakers comprising standards, brackets, a shaft, an angle latch, movable arms, a reciprocating cross piece carried by said arms, a fixed cross piece and conductor contacts, a rod, and adjustable nuts carried by said head to act in conjunction with said circuit breakers, as described and for the purposes set forth.

10. In a controller, standards, circuit breakers carried by said standards, said circuit breakers comprising conductor contacts, spring-pressed arms carrying conductor contacts adapted to engage the first said contacts, latches for holding said spring-pressed arms with their contacts in engagement with first said contacts, a reciprocatory head arranged between said standards, and arms carried thereby having adjustable nuts adapted to move through said standards for releasing said latches, substantially as described.

11. The combination with an electric reciprocating motor and a rotary motor, a circuit breaker of a controller having two sets of springs, said sets of springs adapted to oppose each other in action, the pressure of one set of said springs normally predominating over the pressure of the second set, and means to increase the pressure of the second said set of springs to predominate over the first said set, substantially as described and for the purposes set forth.

12. In an electric controller for automatically controlling dynamo electric machines and circuits therefrom, the combination with an electric reciprocating motor, standards carrying electrical conductor contacts, a reciprocating head arranged between said standards, an operator rod secured to said reciprocating head, a lock magnet carried by one of said standards, said lock magnet adapted to interrupt the movement and lock said reciprocating head, said lock magnet comprising brackets of magnetic material mounted upon a magnetic conductor, a suitable core having windings of magnet wire, a magnetic conductor rod secured to said core and freely extending through an opening non-magnetically bushed in one of aforesaid brackets, said rod resiliently and adjustably supported on said bracket, magnetic conductor clamps surrounding said operator rod, one of said clamps secured to one of the ends of said core, and the other clamp movably supported by the other of said brackets.

13. In a controller, the combination with a prime mover, of a head reciprocated thereby, contacts, disks movably supported by said head, and contacts carried thereby and a cut out switch adapted for causing a cessation in the operation of said prime mover.

14. A controller for electrical circuits comprising contacts, a reciprocatory head arranged between said contacts, resiliently supported disks carried by said head, contacts carried by said disk for engaging the first mentioned contacts, and circuit breakers alternately actuated by virtue of said reciprocating head.

15. A controller for electrical circuits comprising confronting contacts, circuit breakers, contacts movably mounted for alternately engaging the first mentioned contacts, and means for supporting the last mentioned contacts and for alternately actuating said circuit breakers.

16. In a controller, standards, circuit breakers carried by said standards, said circuit breakers comprising contacts, spring-pressed arms adapted to engage said contacts, latches for holding said spring-pressed arms in engagement with said contacts, a reciprocatory head arranged between said standards, arms carried thereby and having adjustable nuts, said arms being adapted to move through said standards for releasing said latches, and electrical connections established at each stroke of said head.

17. In a controller, standards, circuit breakers carried thereby, said circuit breakers comprising contacts, arms adapted to engage said contacts, latches for normally holding said arms in engagement with said contacts, a reciprocatory head for releasing said arms, and electrical connections established by the movement of said head.

18. The combination with a motor and a suitable source of electrical energy, of standards, electrical conductor contacts carried thereby, wires connecting said contacts with said motor, a reverser head arranged between said standards, a reciprocating electric motor for moving said head, springs for producing a supplementary action for operating said reverser head, a plurality of rods carried by said head, adjustable disks resiliently supported by said rods, insulated conductor contacts carried by said disk and adapted to engage the contacts of said standards to allow free movement of said rods and reverser head for starting the first mentioned motor.

19. The combination with a motor and circuits therefor, of standards, electrical conductor contacts carried thereby, a reverser head arranged between said standards, a reciprocating electric motor for operating said reverser head, springs for producing a supplementary action in connection with said reciprocating motor, an operator switch for closing and opening the circuit to said reciprocating motor, the direction in which said operator switch is closed determining the direction in which said reciprocating motor armature and reverser head move, and consequently the direction of rotation of the first mentioned motor armature.

20. In an electric controller for automatically controlling electric motors, the combination of a base, standards mounted thereon, electrical conductor contacts carried by said standards, binding posts carried by one of said standards, automatic circuit breakers arranged upon said standards, a lock magnet carried by one of said standards, rods connecting said standards, a main reciprocating head slidably mounted upon said rods, conductor contacts movably supported by said head, means to move said main reciprocating head, means for normally holding said reciprocating head in a position central of said standards, means for retarding the movement of said main reciprocating head in either direction, and means to provide a free movement of said main reciprocating head from either of said standards to a point intermediate said standards.

21. In an electric controller, the combination of a movable cross head, arms carried thereby, resilient contacts supported by said arms, standards, contacts supported by said standards and adapted to be engaged by the resilient contacts of said arms, circuit breakers carried by said standards, a lock magnet carried by one of said standards, and operative by virtue of circuits through said contacts, and a rheostat arranged to coöperate with said movable head.

22. The combination with an electric reciprocating motor, of an electric controlling apparatus moved thereby, a manual switch for closing the circuit in said reciprocating motor, an electric rotary motor, a resistance in series with said electric rotary motor, said electric controlling apparatus including means whereby said resistance is gradually cut out of the rotary motor circuit, and means actuated following the elimination of the resistance in said rotary motor circuit for locking a portion of said apparatus and opening the circuit to the above mentioned reciprocating motor.

23. The combination with a supply circuit, a rotary motor, and a resistance in circuit therewith, standards mounted with resilient adjustable contacts, a lock magnet carried by one of said standards, a reverser head arranged between said standards supporting conductor contacts, a rod secured to the said reverser head and extending through one of said standards and through the clamp member of the said lock magnet, and secured to the armature of a reciprocating motor, said reverser head actuated by the said reciprocating motor with a supplementary action of springs interposed between said reverser head and standards, some of said resilient conductor contacts on the said standards adjusted to engage simultaneously while the other resilient contacts are adjusted to engage successively the conductor contacts on the said reverser head, a manual switch for the reciprocating motor, means consequent the closing of the said manual switch whereby the said rotary motor is connected to the supply circuit and the resistance in circuit with said rotary motor is cut out step by step, substantially as described.

24. The combination with an electric rotary motor, standards, a lock magnet, a reverser head coupled to an electric reciprocating motor, resilient conductor contacts adapted to engage stationary conductor contacts, means to automatically and gradually start in either direction said rotary motor, substantially as described.

In testimony whereof I affix my signature in the presence of two witnesses.

JOHN P. HAYES.

Witnesses:
MAX H. SROLOVITZ,
K. H. BUTLER.

Copies of this patent may be obtained for five cents each, by addressing the "Commissioner of Patents, Washington, D. C."